Patented Aug. 7, 1951

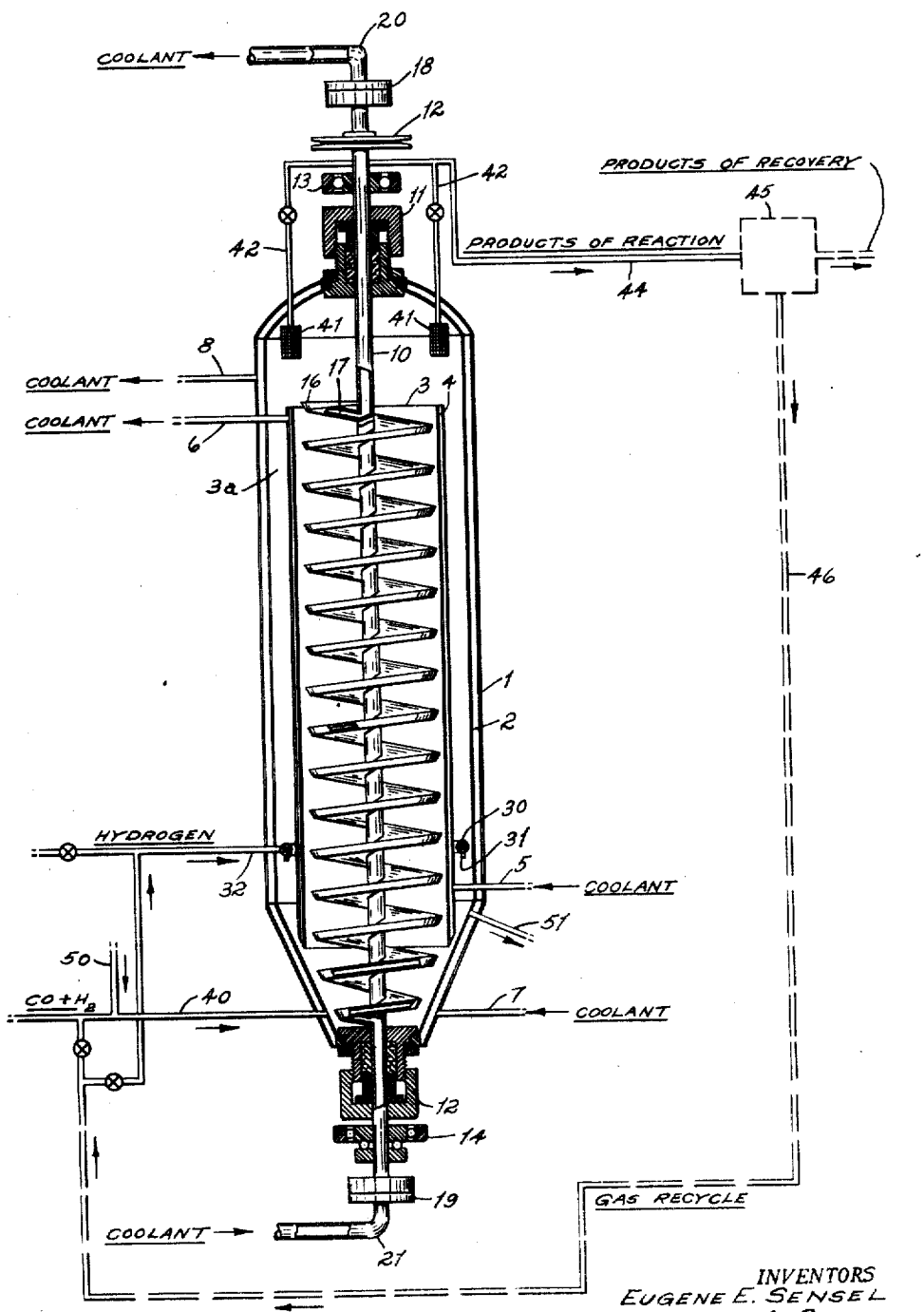

2,562,993

UNITED STATES PATENT OFFICE 2,562,993

APPARATUS FOR EFFECTING CATALYTIC REACTIONS

Eugene E. Sensel, Beacon, and Roland A. Beck, Glenham, N. Y., assignors to The Texas Company, New York, N. Y., a corporation of Delaware Application October 1, 1946, Serial No. 700,507

2 Claims. (Cl. 23—288)

This invention relates to apparatus for effecting catalytic conversion reactions and more particularly for effecting conversion of gaseous reactants with a catalyst in solid particle form.

The apparatus of this invention comprises a cylindrical reaction zone having a helical screw rotatably supported within it and adapted for elevating catalyst particles within or through the reaction zone. The cylindrical reaction zone which is advantageously vertical is in turn supported within a vessel, the interior wall of which is spaced a substantial distance from the exterior wall of the reaction zone so as to provide an annular space therebetween.

The helical screw is preferably of hollow construction with provision for flow of a heat carrier fluid through the interior of the helix. Advantageously the walls of the reaction zone and of the outer vessel are jacketed or are of hollow construction with provision for flowing heat carrier fluid therethrough.

In operation a substantial body of catalyst in solid particle form is maintained within the reaction zone in contact with the helical screw, and gaseous reactants are continuously passed upwardly through the reaction zone around the flights of the helix. If desired, the flights may be perforated to permit flow of at least a portion of the gaseous reactants through the perforations. Gaseous reactants and catalyst thus rise concurrently through the reaction zone.

Catalyst upon being lifted to the top of the reaction zone by the helical screw overflows into the aforesaid annular space through which it descends for return to the lower portion of the reaction zone.

Provision is made for stripping products of reaction from the returning catalyst as it descends through the annular space. Cooling of the returning catalyst is also effected by indirect heat exchange with cooling fluid flowing through the jacketed walls forming the annular space.

Resulting products of reaction issuing from the reaction zone into the interior of the upper portion of the surrounding vessel are continuously discharged therefrom for such further treatment as may be desired.

An important advantage of the reactor of this invention resides in its ability to maintain the catalyst in a fluidized state within the reaction zone during the conversion reaction, irrespective of the density of the particular catalyst being used and the contraction in vapor occurring as a result of the reaction.

For example, in the conversion of synthesis gas into hydrocarbons, substantial contraction in volume of vapor occurs during the reaction, which contraction normally causes some loss in fluidization of a powdered catalyst in a more conventional type of reactor wherein fluidization is effected solely by means of the gas flow therethrough. Also with catalyst of high density, extremely high rates of gas flow are necessary to effect fluidization in a conventional reactor not provided with a helix such as contemplated in the present invention. Fluidization of dense catalyst particles without the necessity for maintaining undesirably high rates of gas flow is a material advantage in the case of those conversion reactions which are relatively slow and require more time.

Reference will now be made to the accompanying drawing for a more detailed description of the invention.

The numeral 1 designates a vessel having a hollow wall providing a space 2 through which a cooling fluid may circulate.

The numeral 3 designates a cylindrical vessel, supported by supports not shown, within the vessel 1. The vessel 3 is also constructed with a hollow wall to provide a space 4 through which cooling fluid may circulate. As indicated the vessel 3 is of smaller diameter than the vessel 1 so that an annular space 3a is provided between the exterior wall surface of the inner vessel 3 and the inner wall surface of the outer vessel 1. Pipe connections 5 and 6 provide means for introducing cooling fluid to and removing such fluid from the jacket space 4. Similar pipe connections 7 and 8 provide means for introducing cooling fluid to and removing it from the jacket space 2 of the outer vessel 1.

The numeral 10 designates a shaft axially supported within the concentric vessels. The upper and lower extremities of the shaft 10 extend through stuffing boxes 11 and 12 respectively, which boxes are provided in the upper and lower extremities respectively of the vessel 1. The shaft 10 is capable of rotation within the stuffing boxes which latter provide against leakage of fluids and also catalyst from the interior of the vessel.

Bearings 13 and 14 provide stationary bearing surfaces for the shaft 10 and in which it rotates, rotation being effected by rotation of a pulley or gear 15 integrally attached to a portion of the shaft extending outside the vessel 1. The bearing surfaces are adapted to oppose lateral and vertical thrust.

The portion of the shaft 10 extending through the inner vessel 3 is provided with a hollow helix 16 which is also made integral with the shaft. The hollow space of the helix 16 is indicated by the numeral 17, which hollow space at the upper end of the helix is in fluid communication with the interior and hollow end of the shaft 10. The interior of the hollow helix at its lower end is also in fluid communication with the hollow interior of the lower extremity of the shaft 10.

The upper and lower ends of the shaft 10 terminate in couplings 18 and 19 respectively which are shown in an elevation view. These couplings are each formed of two sections, namely, a rotating section and a fixed section. The rotating sections are rigidly attached to the upper and lower ends of the shaft 10. During rotation of the shaft 10, these rotating sections form a sliding and leakproof joint with their companion fixed sections of the couplings 18 and 19 which are of the stuffing box variety.

The fixed sections are rigidly attached to pipes 20 and 21 respectively.

As indicated in the drawing, the lower portion of the vessel 1 is of conical construction, and the bottom rim of the inner vessel 3 approaches the inner conical wall of vessel 1 sufficiently to provide a restricted circular space through which the solid catalyst in particle form may descend as will be mentioned later.

The lower end of the helix 16 is also tapered so as to conform to the interior of the conical bottom of the vessel.

The peripheral and under edge of the helix is beveled at an angle of about 30° from the adjacent inner wall of the vessel 3 thereby forming a knife-like edge adjacent the inner wall of the reaction zone. The clearance between the knife-like edge of the helix and the inner wall of the reaction vessel varies with the size of the reactor and the rate at which it is desired to have powdered catalyst gravitate towards the lower portion of the reaction zone. Although this may be varied depending upon such factors as the diameter of the helix, it has been found that this tapered edge of the helix is advantageous from the standpoint of preventing catalyst particles from jamming or lodging between the peripheral edge of the helix and the adjacent wall surface of the reactor.

While not indicated in the drawing, the flights of the helix may have small tubular ports extending therethrough to provide perforations through which gaseous reactants may rise.

The numeral 30 designates a ring distributor positioned within the annular space between the inner and outer vessels, the ring being provided with a plurality of ports or nozzles 31 projecting from the ring. A pipe 32 communicates with the ring 30 through which gaseous fluid may be introduced as will be described.

The operation of the reactor will now be described when used for converting carbon monoxide and hydrogen into hydrocarbons, oxygenated compounds and the like by contact with a powdered catalyst of the iron type at a temperature in the range of about 550–650° F. The catalyst may comprise about 94% metallic iron, about 4% alumina and 0.1 to 2% potassium oxide. The catalyst particle size may range from about 60 to 325 mesh. The reaction may be carried out under a pressure of about 150–250 pounds.

Synthesis gas comprising carbon monoxide and hydrogen preheated if necessary to any desired temperature is conducted from a source not shown through a pipe 40 and introduced near the bottom of the vessel 1. The introduced gaseous reactants rise along or through the flights of the rotating helix in contact with the catalyst powder which is being lifted upwardly through the reaction zone by the rotating helix. There is thus concurrent flow of catalyst and reactants upwardly through the vessel 3, during which flow, conversion of reactants takes place to form the desired products of reaction. The helix may be rotated at from about 100 to 2000 revolutions per minute. The gaseous reactants may be introduced at sufficient rate to flow through the reaction zone at a space velocity ranging from 100 to 5000 cubic feet per cubic foot of reactor space per hour.

The rate of helix rotation and the space velocity of the reactant gases are correlated so as to maintain the catalyst in a fluidized state within the reaction zone.

The unreacted gas and products of reaction containing some entrained catalyst powder rise into the top of the vessel 1 above the vessel 3. The gases and vapors are caused to flow through filters 41 which may be constructed of porous Alundum or other porous material adapted to permit passage of gases and effect removal of suspended solids, the removed solids thus remaining within the reaction vessel. The gases and vapors flow from the filters 41 through pipes 42 to a common discharge pipe 44 which may lead to suitable product recovery means indicated by the block 45.

Provision may be made for separating unreacted gases or constituents thereof from the products of reaction and recycling them through a conduit 46 to the previously mentioned pipe 40.

Since the synthesis reaction is highly exothermic, it is necessary to dissipate the heat of reaction and this is accomplished by circulating a cooling liquid such as water or an organic compound such as diphenyl through the cooling jackets surrounding the inner and outer vessels and through the hollow helix. The cooling liquid for the helix may be introduced through the pipe 21 which communicates through the coupling 19 with the lower end of the helix. This liquid then flows through the interior of each flight of the helix and is discharged therefrom into the upper end of the hollow shaft 10 from which it flows through the coupling 18 and the pipe 20.

The catalyst powder rising to the top of the inner vessel 3 spills over into the annular space 3a and moves downwardly therethrough countercurrently to a rising stream of stripping gas. This stripping gas, for example hydrogen, is introduced through the pipe 32 into the distributing ring 30 from which it is discharged into the annular space. The stripping gas thus effects desorption of hydrocarbons and other products of reaction which are adsorbed by the catalyst during its passage upwardly through the vessel 3.

Catalyst powder may be added to the reactor through pipe 50 and pipe 40, through which it is forced by the feed gas. Used catalyst may be drawn off through a pipe 51. Provision, not shown, may be made for continuously drawing off a small amount of used catalyst through pipe 51, reactivating it, and recycling it to the reactor through pipe 50.

While mention has been made of using the apparatus for effecting synthesis reactions, nevertheless it is contemplated that it may be employed for other conversion reactions such as polymerization and dehydrogenation. It may be employed for either exothermic or endothermic reactions.

Various types of solid catalyst may be used.

The catalyst may be of either the supported or non-supported type. In the case of the synthesis reaction, the catalyst may comprise other metals of the iron group such as cobalt or nickel and may contain other promoters such as the oxides of thorium, vanadium, uranium, calcium, magnesium, etc.

Reaction pressures ranging from atmospheric to 1500 pounds or more may be employed and reaction temperatures ranging from 200–700° F. or more may be used for the synthesis reaction and even higher temperatures in the case of other type of conversion reactions.

In the foregoing synthesis operation described in connection with the drawing, reference has been made to using hydrogen as the stripping medium; however, other gases may be used including recycle gas derived from the end products of the reaction. Such recycle gas may be enriched with hydrogen. The velocity at which the stripping gas rises through the annular space $3a$ is maintained sufficiently low so as not to entrain the descending catalyst, at least to any substantial extent, in the gas as it rises therethrough. The stripping gas after rising through the annular space $3a$ mingles with the products of reaction and is removed from the reaction zone.

Obviously many modifications and variations of the invention as hereinbefore set forth, may be made without departing from the spirit and scope thereof, only such limitations should be imposed as are indicated in the appended claims.

We claim:

1. A reactor for the conversion of gaseous reactants with a finely-divided solid catalyst which comprises a vertical vessel, a vertical reaction tube supported within said vessel, a vertical annular channel between said tube and said vessel the upper and lower ends respectively of said tube being in fluid communication with the upper and lower portions respectively of said channel, a continuous vertical helical screw rotatively supported within said tube, said helical screw comprising a substantially continuous, helically disposed flange extending radially outwardly from the axis of said screw, said flange having spaced, generally parallel upper and lower surfaces and terminating in their outer margins in a peripheral face extending between said upper and lower surfaces and spaced inwardly from the inner surface of said vertical reaction tube, said peripheral face being inclined toward the axis of the helical screw in a downward direction such as to permit marginal gravitation of cascading catalyst particles, means for rotating said helix, means for introducing gaseous reactants to the lower end of said tube and means for removing gaseous products of reaction from the upper end of said vessel.

2. A reactor for the conversion of gaseous reactants with a finely-divided solid catalyst which comprises a vertical, cylindrical vessel having a conical lower portion, a vertical reaction tube supported within said vessel, the lower portion of said tube extending into the conical portion of said vessel, an annular channel between said tube and said vessel, the upper and lower ends of said tube being in fluid communication with the upper and lower portions respectively of said channel, a continuous helical screw extending substantially completely through said tube into the conical portion of said vessel, means to rotate said helical screw, the portion of said screw within said conical portion being tapered to conform substantially to the interior of said conical portion, means for introducing gaseous reactants to said conical portion at a point within the extended plane of the wall of said tube and means for removing gaseous products of reaction from the upper end of said vessel.

EUGENE E. SENSEL.
ROLAND A. BECK.

REFERENCES CITED

The following references are of record in the file of this patent:

UNITED STATES PATENTS

| Number | Name | Date |
|---|---|---|
| 1,334,495 | Jackson | Mar. 23, 1920 |
| 2,397,566 | Schutte | Apr. 2, 1946 |
| 2,419,088 | Putney | Apr. 15, 1947 |

FOREIGN PATENTS

| Number | Country | Date |
|---|---|---|
| 509,464 | France | Aug. 18, 1920 |